(12) United States Patent
Cham

(10) Patent No.: US 7,345,831 B1
(45) Date of Patent: Mar. 18, 2008

(54) MAGNIFIER WITH LAMP

(75) Inventor: Kin Shing Cham, New Territories (CN)

(73) Assignee: Great Wall (Optical) Plastic Works Limited, New Territories, Hong Kong Sar (CN)

( * ) Notice: Subject to any disclaimer, the term of this patent is extended or adjusted under 35 U.S.C. 154(b) by 0 days.

(21) Appl. No.: 11/681,934

(22) Filed: Mar. 5, 2007

(51) Int. Cl.
*G02B 27/02* (2006.01)
*G02B 7/02* (2006.01)

(52) U.S. Cl. .................. 359/802; 359/803; 359/819

(58) Field of Classification Search ............ 359/802, 359/803, 808, 809, 819, 822; 362/188, 208, 362/269, 282, 287
See application file for complete search history.

(56) References Cited

U.S. PATENT DOCUMENTS

| | | | |
|---|---|---|---|
| 5,642,234 A * | 6/1997 | Altman et al. ............. | 359/802 |
| 5,937,681 A * | 8/1999 | Myhr et al. ............... | 70/456 R |
| 6,483,651 B1 * | 11/2002 | Maurer ...................... | 359/819 |
| 7,139,136 B2 * | 11/2006 | Waggoner et al. ......... | 359/803 |

* cited by examiner

*Primary Examiner*—M. Hasan
(74) *Attorney, Agent, or Firm*—Leydig, Voit & Mayer, Ltd.

(57) ABSTRACT

A card-shaped pocket magnifier device includes a magnifying lens having a pair of opposite optical surfaces. A housing disposed in a recess in the lens, or within a card-shaped envelope of the device, encloses LEDs, a battery and a switch connected by an electrical circuit. The LEDs direct light both edgewise into the lens, for illuminating the lens itself, and away from the lens to illuminate the field of view.

5 Claims, 4 Drawing Sheets

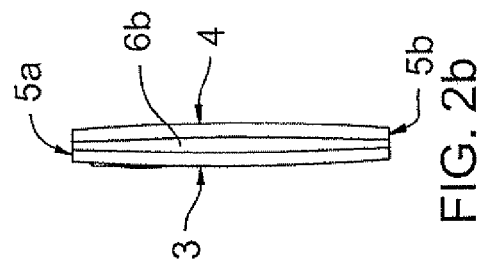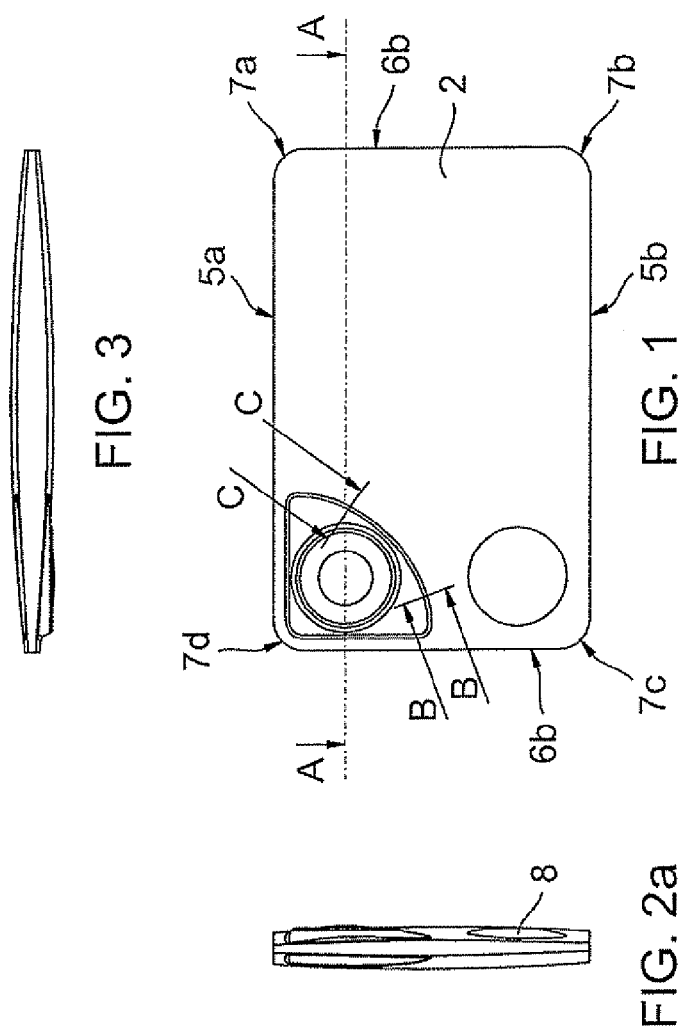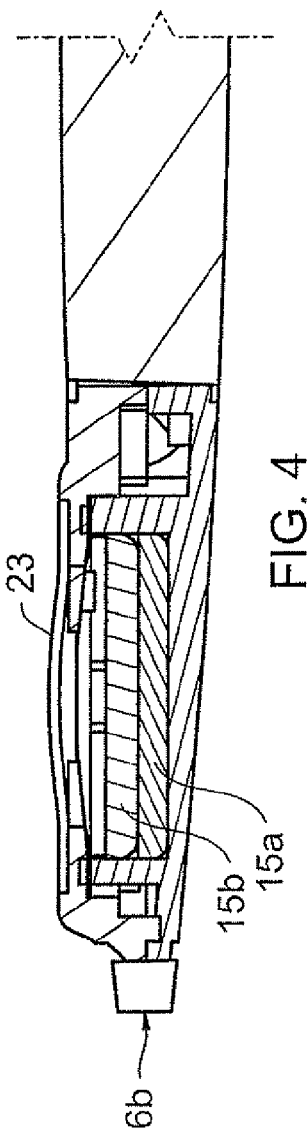

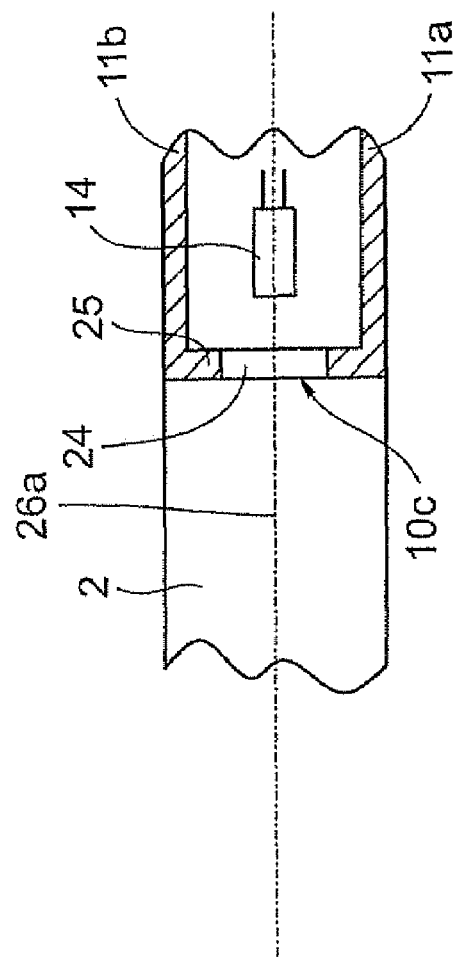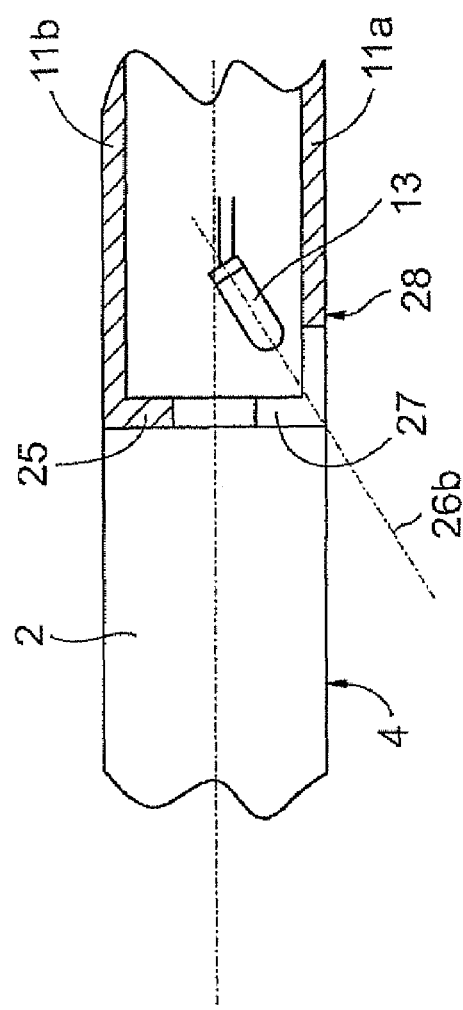

MAGNIFIER WITH LAMP

TECHNICAL FIELD

The present invention relates to magnifying devices for use in low ambient light levels.

BACKGROUND OF THE INVENTION

For everyday use, many people find it convenient to carry a small magnifying glass in a wallet or pocket so that it can be readily accessed as needed, normally to assist with reading. However, these magnifying glasses have reduced utility in low ambient light levels.

In the manufacture and repair of small mechanical items, and in other specialist areas, magnifying glasses with illumination sources are used. These include magnifying glasses carrying a halogen lamp for illuminating the viewing field. The major disadvantage of these products include the relatively large dimensions, as well as the high heat evolution from the halogen lamp and high electric power requirements for their operation so that either only stationary power supply devices with no mobility or battery-operated power supply units which are heavy can be used.

While a small magnifying glass and a separate miniature portable flashlight may well be small enough to be carried in a wallet or pocket art, it will be appreciated that there is a need for an integrated magnifying device for use in low ambient light levels. Moreover, because of their small size, the optic surfaces of small portable magnifying glasses are inevitably contacted by the fingers in use, becoming obscured. In low ambient light levels, any obscuring of the optic surfaces further reduces the utility of the lens. It is an object of the present invention to overcome or substantially ameliorate the above disadvantages or more generally to provide an improved pocket magnifier.

DISCLOSURE OF THE INVENTION

According to one aspect of the present invention there is provided a magnifier device, comprising:

a magnifying lens;

a lamp disposed within the lens;

a battery coupled to the lamp, and a switch for selectively closing an electrical circuit between the battery and the lamp.

Preferably the lens includes a pair of opposite optical surfaces and the lamp is disposed in a recess extending between the optical surfaces. The switch preferably comprises a pressure-sensitive switch. Most preferably the lamp comprises a light-emitting diode (LED).

In another aspect the invention provides a card-shaped pocket magnifier device, comprising:

a magnifying lens having a pair of opposite optical surfaces and a periphery including two pairs of opposing edge faces, a recess in the lens, the recess bounded by a border surface joining the opposite optical surfaces of the lens, a housing disposed in the recess at least one lamp mounted in the recess adjacent the border surface a battery received in the housing, the battery having a generally planar configuration with opposite faces and a pair of electrical terminals of opposite polarities mounted on one of the opposite faces;

a lamp switch mounted in the housing and actuatable between on and off conditions; and means for forming a lamp circuit which includes the lamp, the terminals of the battery and the lamp switch such that the lamp projects a beam for directing light through the border surface in response to actuation of the lamp switch.

The border surface preferably forms a closed shape. Alternatively, the border surface may join the edge faces.

Preferably the housing-receiving recess is formed adjacent a corner of the lens.

Preferably the housing is opaque, and has a housing edge complementary to the border surface, each lamp being received in the housing adjacent an opening in the housing edge through which the lamp radiates light into the lens.

Preferably the opening in the housing edge extends through a face of the housing adjacent one of the optical surfaces, whereby the lamp radiates light through the opening both away from the lens and into the lens.

In still another aspect the invention provides a card-shaped pocket magnifier device, comprising:

a magnifying lens having a pair of opposite optical surfaces bounded by a peripheral edge;

a housing fixed to the lens;

at least one lamp mounted in the housing for directing a light beam through the peripheral edge a battery received in the housing, the battery having a generally planar configuration with opposite faces and a pair of electrical terminals of opposite polarities mounted on one of the opposite faces;

a lamp switch mounted in the housing and actuatable between on and off conditions; and means for forming a lamp circuit which includes the lamp, the terminals of the battery and the lamp switch such that the lamp projects a beam for directing light through the peripheral edge in response to actuation of the lamp switch.

This invention provides a magnifier which is effective and efficient in use in low ambient light levels, and which has an overall simple design that minimizes manufacturing costs. Integrating a lamp and lens within a card-shaped envelope provides a compact device for carrying in a pocket, wallet, or the like.

BRIEF DESCRIPTION OF THE DRAWINGS

Preferred forms of the present invention will now be described by way of example with reference to the accompanying drawings, wherein:

FIG. 1 is a plan view of a preferred pocket magnifier device according to the invention;

FIGS. 2*a* and 2*b* are opposing side views of the device of FIG. 1;

FIG. 3 is a third side view of the device of FIG. 1;

FIG. 4 is a fragmentary cross section along line AA of FIG. 1;

FIG. 6 is a fragmentary cross section along line BB of FIG. 1;

FIG. 7 is a fragmentary cross section along line CC of FIG. 1;

DESCRIPTION OF THE PREFERRED EMBODIMENTS

Figure 5:
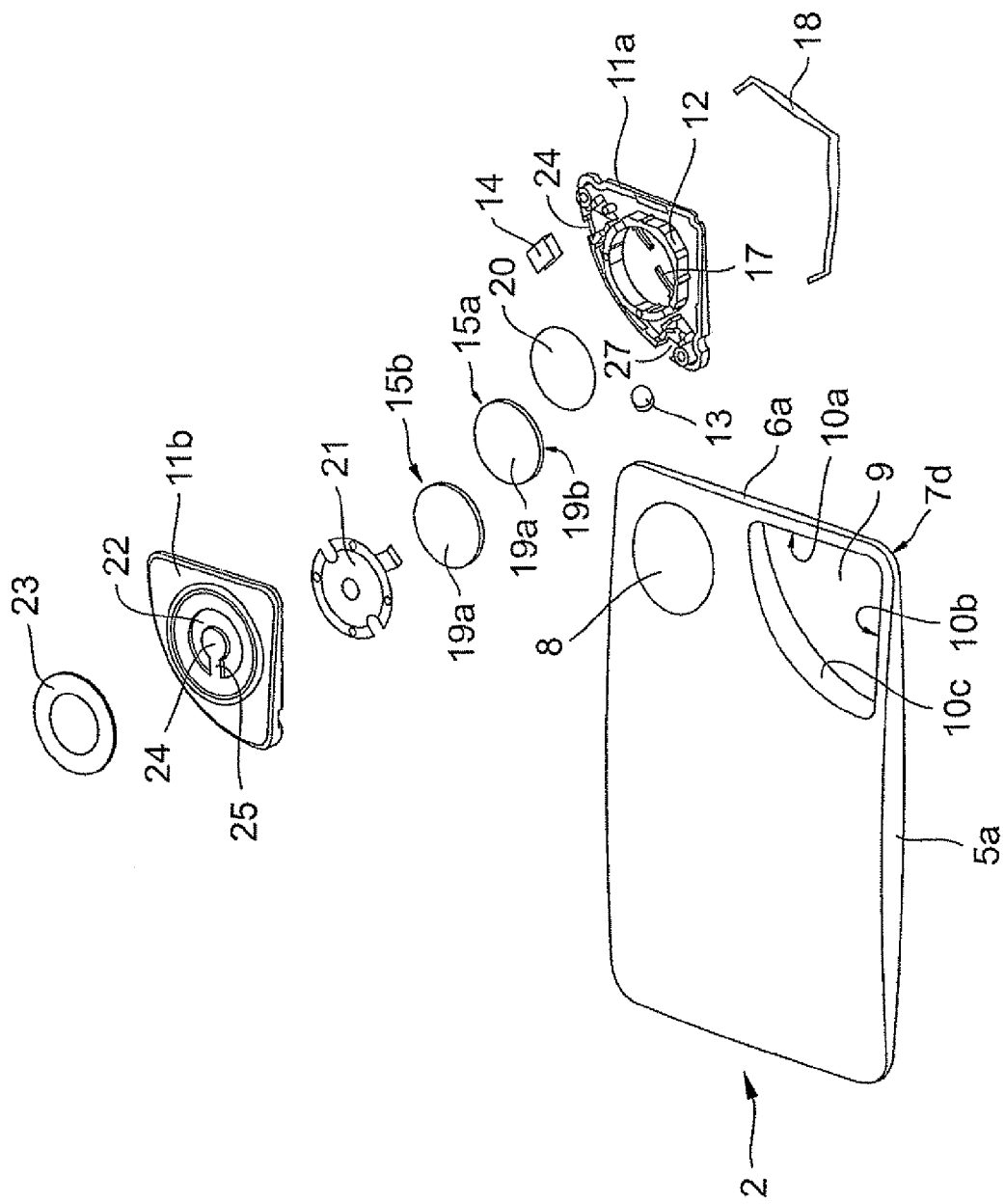
FIG. 5 is an exploded pictorial view of the device of FIG. 1.

Referring to the drawings, a pocket magnifier device 1 includes a magnifying lens 2 with opposing convex optical surfaces 3, 4. The magnifying lens 2 is generally of a rectangular card-shape, its periphery including long and short pairs of opposing edge faces 5a, 5b, 6a, 6b joined by radiused corners 7a-7d. Integrally formed in the magnifying lens 2 adjacent corner 7c is a second magnifying optic 8.

Proximate the corner 7d is a recess 9 in the lens 2 extends between the optical surfaces 3, 4. The recess 9 bounded by a border surface 10 joining the opposite optical surfaces 3, 4 and including portions 10a, 10b generally parallel to the edges faces 6a, 5a respectively, and subtended by arcuate portion 10c.

Of complementary shape to, and received within the recess 9, the housing is moulded from opaque polymeric material and includes a housing base 11a and housing top 11b which enclose LEDs 13, 14, two batteries 15a, 15b, pressure-sensitive switch 16 and conductors 17, 18. The electric circuit includes conductors 17 18, disc 20 and diaphragm 21. The conductor 17 extends from within the ring 12 in the base housing 11a to each LED 13, 14, the disc 20 abutting conductors 17. The conductor 18 also electrically connects each LED to the diaphragm 21. Each battery 15a, 15b has a generally planar configuration with a pair of electrical terminals 19a, 19b of opposite polarities mounted on opposite circular faces. The batteries are stacked within the ring 12 upon disc 17 and diaphragm 21 is supported upon the lip of the ring 12. A tab 24 is supported by a hinge 25 in an aperture 22 in the housing top 11b. The aperture 22 is closed by a flexible cover 23. In this manner pressure on the cover 23 acts to press the diaphragm 21 to contact terminal 19a of battery 15b, to thereby close the circuit for operation of the LEDs.

The housing 11a,11b has an arcuate edge 25 generally abutting the portion 10c of the border surface 10. An opening 24 in the arcuate edge 25 is provided adjacent the LED 14 through which the LED radiates light into the lens 2. The LED 14 has an optical axis 26a along which the point of the highest luminance lies, the optical axis 26a is generally aligned with a central plane of the lens 2.

An opening 27 in the arcuate edge 25 also extends through a face 28 of the housing base 11a adjacent the optical surface 4, such that the LED radiates light through the opening 27 both into the lens 2 away from the lens 2 for illuminating the lens itself, and away from the lens to illuminate the field of view. The LED 13 has an optical axis 26b outwardly inclined to pass through the optical surface 4.

The LEDs 13, 14 have especially high efficiency, for example, an efficiency in excess of 80. Due to the high efficiency of the LEDs used, minimal ventilation for cooling is needed and they be positioned within a recess in the magnifying glass. Each LED has a light spectrum which corresponds to that of white light, i.e. for example daylight or approximately daylight. The illumination means is not only small and light, but is also invulnerable to impacts due to being placed in the recess 9. By operating the LEDs 13, 14 the lens 2 is internally illuminated and this allows, for instance, any dust or film present on the optical surfaces 3, 4 to be readily seen to determine a need for cleaning of the lens. On the other hand, the light directed to the field of view also allows the device to be used in a like manner to a flashlight.

Figure 9:
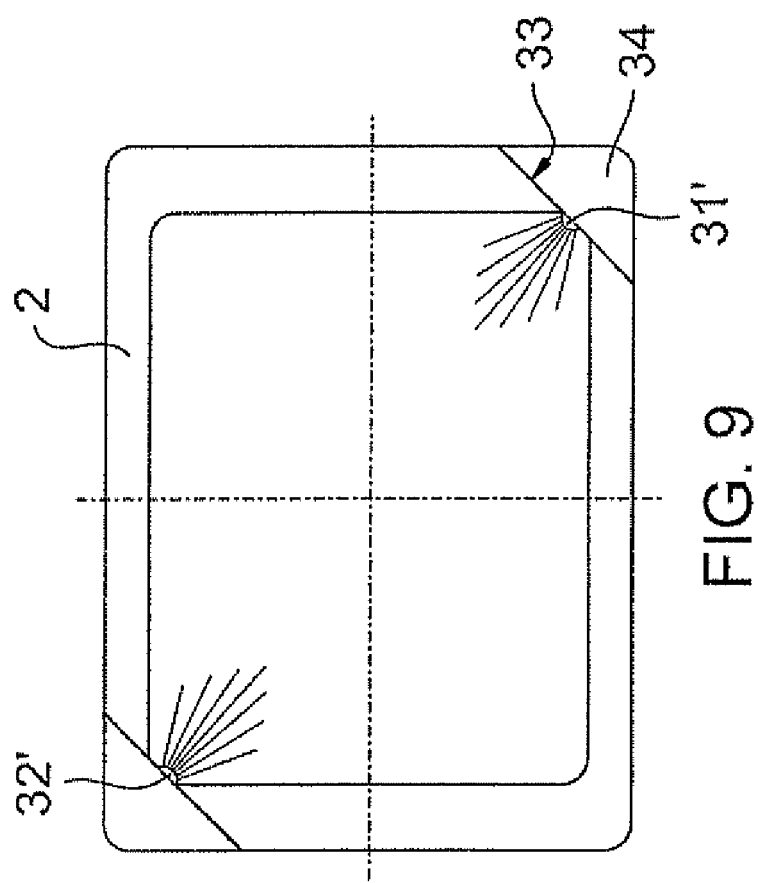
FIG. 9 is a plan view of a second alternative embodiment of a pocket magnifier device according to the invention.
Figure 8A:
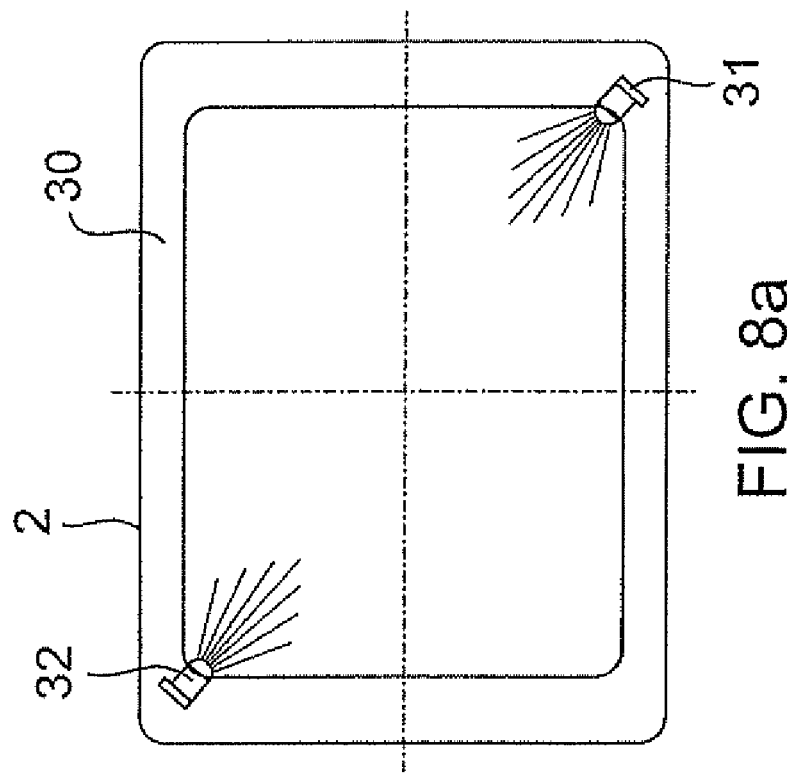
FIGS. 8*a* and 8*b* are a plan and side elevation respectively of a first alternative embodiment of a pocket magnifier device according to the invention.
Figure 8B:
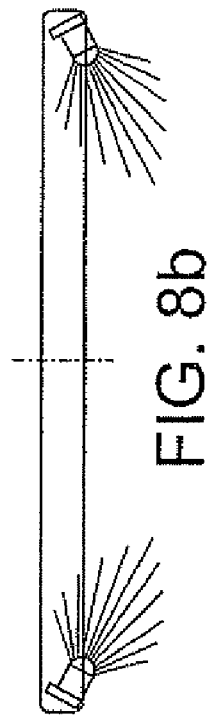

FIGS. 8a, 8b and 9 show other possible embodiments, in a partial representation, illustrating that the LEDs can be placed adjacent an edge of the lens within a card-shaped envelope, and not necessarily in a recess in the lens itself. In this first alternative embodiment LEDs 31, 32 are received in diagonally opposite corners of a frame 30. Each LED 31, 32 has an outwardly directed optical axis, but due to the field of light emitted, some light is directed edgewise into the lens 2. In the second alternative embodiment of FIG. 9, the diagonally opposite corners of the lens 2 are chamfered to produce border surface 33. The LEDs 31', 32' are received within triangular housings 34 lying within the card-shaped outline of the device to direct light edgewise through the respective surfaces 33. Reflectors may be provided in the frame 30, or the peripheral edges of the lens 2 may be orientated to reflect light from the LEDs into the field of view.

Aspects of the present invention have been described by way of example only and it should be appreciated that further modifications and additions may be made thereto without departing from the scope thereof.

The invention claimed is:

1. A card-shaped pocket magnifier device comprising:
   a magnifying lens having a pair of opposite optical surfaces and a periphery including two pairs of opposing edge faces, a recess in the lens, the recess being bounded by a border surface forming a closed shape and joining the opposite optical surfaces of the lens;
   an opaque housing disposed in the recess and having a housing edge complementary to the border surface;
   at least one lamp mounted in the recess adjacent the border surface, wherein the at least one lamp is received in the housing adjacent an opening in the housing edge and through which the lamp radiates light into the lens;
   a battery received in the housing, the battery having a generally planar configuration with opposite faces and a pair of electrical terminals of opposite polarities mounted on one of the opposite faces;
   a lamp switch mounted in the housing and actuatable between on and off conditions; and
   means for forming a lamp circuit which includes the lamp, the terminals of the battery, and the lamp switch, such that the lamp projects a light beam through the border surface in response to actuation of the lamp switch.

2. The device of claim 1 wherein the switch comprises a pressure-sensitive switch.

3. The device of claim 1 wherein the lamp comprises a light-emitting diode.

4. The device of claim 1 wherein the housing-receiving recess is located adjacent a corner of the lens.

5. The device of claim 1 wherein the opening in the housing edge extends through a face of the housing adjacent one of the optical surfaces, whereby the lamp radiates light through the opening, both away from the lens and into the lens.

* * * * *